United States Patent
Bonn et al.

(10) Patent No.: US 9,110,774 B1
(45) Date of Patent: Aug. 18, 2015

(54) SYSTEM AND METHOD OF UTILIZING DRIVING PROFILES VIA A MOBILE DEVICE

(71) Applicant: Sprint Communications Company L.P., Overland Park, KS (US)

(72) Inventors: Mark J. Bonn, Granite Bay, CA (US); Gary D. Koller, Overland Park, KS (US); Mark D. Peden, Olathe, KS (US); Raymond E. Reeves, Oviedo, FL (US); Simon Youngs, Overland Park, KS (US); Lei Zhang, Reston, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 166 days.

(21) Appl. No.: 13/844,226

(22) Filed: Mar. 15, 2013

(51) Int. Cl.
 *G06F 17/00* (2006.01)
 *G06F 3/0484* (2013.01)
 *G08G 1/00* (2006.01)

(52) U.S. Cl.
 CPC ............... *G06F 17/00* (2013.01); *G06F 3/0484* (2013.01); *G08G 1/20* (2013.01); *G08G 1/207* (2013.01)

(58) Field of Classification Search
 CPC ............ B60R 16/037; B60R 2325/205; B60R 25/102; B60W 2050/0077; B60W 50/0098; B60W 30/182; G01R 31/3606; G05B 19/409; G06F 17/00; G06F 3/0484; G08G 1/20; G08G 1/207
 See application file for complete search history.

(56) References Cited

U.S. PATENT DOCUMENTS

| 6,622,083 B1 | 9/2003 | Knockeart et al. |
| 7,209,964 B2 | 4/2007 | Dugan et al. |
| 7,366,892 B2 | 4/2008 | Spaur et al. |
| 7,376,392 B2 | 5/2008 | Myojo |
| 7,454,473 B2 | 11/2008 | Suzuki |
| 7,912,224 B2 | 3/2011 | Lee et al. |

(Continued)

FOREIGN PATENT DOCUMENTS

| DE | 102011112540 A1 * | 4/2012 |
| JP | 20062441 A | 9/2006 |

(Continued)

OTHER PUBLICATIONS

First Action Interview Pre-Communication dated Aug. 21, 2012, U.S. Appl. No. 13/218,503, filed Aug. 26, 2011.

(Continued)

*Primary Examiner* — James Trammell
*Assistant Examiner* — Demetra Smith-Stewart

(57) ABSTRACT

A method of configuring operating parameters with a vehicle is disclosed. The method comprises receiving a signal identifying one or more vehicle operating parameters and associating the signal with a mobile device. The method comprises identifying a profile package based on the identification of the one or more vehicle operating parameters, wherein the profile package comprises at least the one or more vehicle operating parameters. The method comprises receiving a signal associating the mobile device with a head unit and transmitting the profile package to one or more controllers, wherein the profile package configures one or more controllers to one or more vehicle operating parameters, wherein the controllers govern the behavior of one or more vehicle components. The method further comprises activating the specific set of one or more vehicle operating parameters of the profile package in response to detecting that the mobile device is disposed at a predetermined position.

15 Claims, 9 Drawing Sheets

(56) References Cited

U.S. PATENT DOCUMENTS

| | | | |
|---|---|---|---|
| 7,949,375 B2 | 5/2011 | Kortge | |
| 7,966,111 B2 | 6/2011 | Moinzadeh et al. | |
| 8,271,050 B2 | 9/2012 | Weiss | |
| 8,457,686 B2 | 6/2013 | Przybylski | |
| 8,484,707 B1 | 7/2013 | Bertz et al. | |
| 8,527,164 B2* | 9/2013 | Staudinger et al. | 701/52 |
| 8,548,532 B1 | 10/2013 | Ng | |
| 8,606,335 B2 | 12/2013 | Ozaki | |
| 8,626,152 B2 | 1/2014 | Farrell et al. | |
| 8,630,747 B2 | 1/2014 | Burcham et al. | |
| 8,676,199 B2 | 3/2014 | Madhavan et al. | |
| 8,750,942 B1 | 6/2014 | Ng | |
| 8,787,949 B2 | 7/2014 | Sumcad et al. | |
| 9,031,498 B1 | 5/2015 | Bertz et al. | |
| 9,032,547 B1 | 5/2015 | Hohler et al. | |
| 2003/0096641 A1 | 5/2003 | Odinak | |
| 2003/0120601 A1 | 6/2003 | Ouye et al. | |
| 2003/0224840 A1 | 12/2003 | Frank et al. | |
| 2004/0125957 A1 | 7/2004 | Rauber et al. | |
| 2004/0157650 A1 | 8/2004 | Wissinger et al. | |
| 2005/0021744 A1 | 1/2005 | Haitsuka et al. | |
| 2005/0065779 A1 | 3/2005 | Odinak | |
| 2005/0113102 A1 | 5/2005 | Kwon et al. | |
| 2007/0086579 A1 | 4/2007 | Lorello et al. | |
| 2007/0113269 A1 | 5/2007 | Zhang | |
| 2007/0124043 A1 | 5/2007 | Ayoub et al. | |
| 2007/0124045 A1 | 5/2007 | Ayoub et al. | |
| 2007/0124046 A1 | 5/2007 | Ayoub et al. | |
| 2007/0160199 A1 | 7/2007 | Sekiguchi et al. | |
| 2008/0034126 A1 | 2/2008 | Baker | |
| 2008/0072047 A1 | 3/2008 | Sarikaya et al. | |
| 2008/0148374 A1 | 6/2008 | Spaur et al. | |
| 2008/0289044 A1 | 11/2008 | Choi | |
| 2008/0307086 A1 | 12/2008 | Brooks et al. | |
| 2009/0028082 A1 | 1/2009 | Wynn et al. | |
| 2009/0049119 A1 | 2/2009 | Marcinkiewicz et al. | |
| 2009/0109941 A1 | 4/2009 | Carter | |
| 2009/0217036 A1 | 8/2009 | Irwin et al. | |
| 2010/0097239 A1 | 4/2010 | Campbell et al. | |
| 2010/0136944 A1* | 6/2010 | Taylor et al. | 455/404.1 |
| 2010/0197362 A1 | 8/2010 | Saitoh et al. | |
| 2010/0220250 A1 | 9/2010 | Vanderwall et al. | |
| 2010/0234071 A1 | 9/2010 | Shabtay et al. | |
| 2010/0235285 A1 | 9/2010 | Hoffberg | |
| 2010/0260350 A1 | 10/2010 | Chutorash et al. | |
| 2010/0285787 A1 | 11/2010 | Matsuda | |
| 2011/0099316 A1 | 4/2011 | Tseng et al. | |
| 2011/0257973 A1 | 10/2011 | Chutorash et al. | |
| 2011/0263293 A1 | 10/2011 | Blake et al. | |
| 2011/0295444 A1 | 12/2011 | Westra et al. | |
| 2011/0310731 A1 | 12/2011 | Park et al. | |
| 2012/0109406 A1 | 5/2012 | Yousefi et al. | |
| 2012/0134497 A1 | 5/2012 | Roitshtein et al. | |
| 2012/0159638 A1 | 6/2012 | McDade, Sr. | |
| 2012/0183221 A1 | 7/2012 | Alasry et al. | |
| 2012/0203557 A1 | 8/2012 | Odinak | |
| 2012/0282895 A1 | 11/2012 | Bai et al. | |
| 2012/0324046 A1* | 12/2012 | Park | 709/217 |
| 2013/0205026 A1* | 8/2013 | Ricci | 709/225 |
| 2013/0218400 A1* | 8/2013 | Knoop et al. | 701/31.4 |
| 2013/0226391 A1* | 8/2013 | Nordbruch et al. | 701/29.3 |
| 2013/0297456 A1 | 11/2013 | Annan et al. | |
| 2014/0068010 A1 | 3/2014 | Nicholson et al. | |
| 2014/0087760 A1 | 3/2014 | Bennett | |
| 2014/0222298 A1* | 8/2014 | Gurin | 701/49 |

FOREIGN PATENT DOCUMENTS

| | | | |
|---|---|---|---|
| WO | 2013166418 A2 | 11/2013 | |
| WO | 2013173331 A1 | 11/2013 | |

OTHER PUBLICATIONS

First Action Interview Office Action dated Jan. 3, 2013, U.S. Appl. No. 13/218,503, filed Aug. 26, 2011.
Final Office Action dated May 7, 2013, U.S. Appl. No. 13/218,503, filed Aug. 26, 2011.
First Action Interview Pre-Interview Communication dated Oct. 26, 2012, U.S. Appl. No. 13/156,438, filed Jun. 9, 2011.
Notice of Allowance dated Feb. 26, 2013, U.S. Appl. No. 13/156,438, filed Jun. 9, 2011.
First Action Interview Pre-Communication dated Jan. 31, 2012, U.S. Appl. No. 13/246,554, filed Sep. 27, 2011.
FAIPP Office Action dated May 21, 2012, U.S. Appl. No. 13/246,554, filed Sep. 27, 2011.
Final Office Action dated Sep. 5, 2012, U.S. Appl. No. 13/246,554, filed Sep. 27, 2011.
Advisory Action dated Nov. 2, 2012, U.S. Appl. No. 13/246,554, filed Sep. 27, 2011.
Office Action dated Dec. 5, 2012, U.S. Appl. No. 13/246,554, filed Sep. 27, 2011.
Notice of Allowance dated May 20, 2013, U.S. Appl. No. 13/246,554, filed Sep. 27, 2011.
Office Action dated Mar. 13, 2013, U.S. Appl. No. 13/471,107, filed May 14, 2012.
Aboda, B., et al., "Exentsible Authentication Protocol (EAP)", Network Working Group, RFC 3748, Standards Track, Jun. 2004.
Shipley, Trevor D., et al. Patent Application entitled "Mobile Communication System Identity Pairing," filed Aug. 26, 2011, U.S. Appl. No. 13/218,503.
Bertz, Lyle T., et al., Patent Application entitled "Secure Changing Auto-Generated Keys for Wireless Access," filed Jun. 9, 2011, U.S. Appl. No. 13/156,438.
Ng, Sei Y., Patent Application entitled "Head Unit to Handset Interface and Integration," filed Sep. 27, 2011, U.S. Appl. No. 13/246,554.
Bertz, Lyle T., et al. Patent Application entitled "Automotive Multi-Generation Connectivity," filed Apr. 26, 2011, U.S. Appl. No. 13/094,494.
Annan, Brandon C., et al. Patent Application entitled "Methods and Systems of Digital Rights Management for Vehicles," filed May 3, 2012, U.S. Appl. No. 13/463,799.
Burcham, Robert H., et al. Patent Application entitled "In-car Head unit Wireless Communication Service Subscription Initialization," filed Apr. 24, 2012, U.S. Appl. No. 13/455,121.
Burcham, Robert H., et al. Patent Application entitled "Alternative Authorization for Telematics," filed May 14, 2012, U.S. Appl. No. 13/471,107.
Bloomcamp, Eric Michael, et al. Patent Application entitled "Dual Path In-Vehicle Communication," filed Feb. 15, 2012, U.S. Appl. No. 13/769,268.
Office Action dated Feb. 5, 2014, U.S. Appl. No. 13/218,503, filed Aug. 26, 2011.
Ng, Sei Y., Patent Application entitled "Head Unit to Handset Interface and Integration," filed Aug. 20, 2013, U.S. Appl. No. 13/971,658.
Bloomcamp, Eric M., et al., Patent Application entitled Authenticating Mobile Device for on Board Diagnostic System Access, filed Sep. 23, 2013, U.S. Appl. No. 14/034,475.
Advisory Action dated Aug. 1, 2013, U.S. Appl. No. 13/218,503, filed Aug. 26, 2011.
Notice of Allowance dated Aug. 26, 2013, U.S. Appl. No. 13/471,107, filed May 14, 2012.
Foreign Communication From a Related Counterpart Application, International Search Report and Written Opinion dated Jun. 13, 2013, International Application No. PCT/US13/40940 filed on May 14, 2013.
Foreign Communication From a Related Counterpart Application, International Search Report and Written Opinion dated Dec. 23, 2013, International Application No. PCT/US13/39514 filed on May 3, 2013.
First Action Interview Pre-Communication dated Nov. 15, 2013, U.S. Appl. No. 13/791,658, filed Aug. 20, 2013.
Notice of Allowance dated Jan. 30, 2014, U.S. Appl. No. 13/791,658, filed Aug. 20, 2013.
Foreign Communication From a Related Counterpart Application, International Preliminary Report on Patentability dated Nov. 13, 2014, PCT/US13/39514 filed on May 3, 2013.

(56) References Cited

OTHER PUBLICATIONS

Foreign Communication From a Related Counterpart Application, International Preliminary Report on Patentability dated Nov. 27, 2014, PCT/US13/40940 filed on May 14, 2013.
Notice of Allowance dated Dec. 3, 2014, U.S. Appl. No. 13/094,494, filed Apr. 26, 2011.
Notice of Allowance dated Jan. 6, 2015, U.S. Appl. No. 13/661,536, filed Oct. 26, 2012.
Supplemental Notice of Allowance dated Jan. 30, 2015, U.S. Appl. No. 13/661,536, filed Oct. 26, 2012.
Final Office Action dated Jun. 16, 2014, U.S. Appl. No. 13/218,503, filed Aug. 26, 2011.
Office Action-Restriction Requirement dated May 7, 2014, U.S. Appl. No. 13/094,494, filed Apr. 26, 2011.
Advisory Action dated Sep. 26, 2014, U.S. Appl. No. 13/218,503, filed Aug. 26, 2011.
Office Action dated Aug. 28, 2014, U.S. Appl. No. 13/094,494, filed Apr. 26, 2011.
Office Action dated Aug. 12, 2014, U.S. Appl. No. 13/769,268, filed Feb. 15, 2013.
Office Action dated Jul. 14, 2014, U.S. Appl. No. 13/661,536, filed Oct. 26, 2012.
Hohler, Rick A., et al., Patent Application entitled "Provisioning Vehicle based Digital Rights Management for Media Delivered via Phone," filed Oct. 26, 2012, U.S. Appl. No. 13/662,536.
Finnerty, Brian J., et al., Patent Application entitled "Method for Authenticating Driver for Registration of In-Vehicle Telematics Unit", filed Oct. 31, 2014, U.S. Appl. No. 14/530,667.
Restriction Requirement dated Mar. 19, 2015, U.S. Appl. No. 13/463,799, filed May 3, 2012.
Final Office Action dated Mar. 17, 2015, U.S. Appl. No. 13/769,268, filed Feb. 15, 2013.
Amireddy, Sridhar Reddy, et al., Patent Application entitled, "Vehicle Remote Operations Control," filed on Apr. 28, 2015, U.S. Appl. No. 14/698,522.

\* cited by examiner

SYSTEM AND METHOD OF UTILIZING DRIVING PROFILES VIA A MOBILE DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Vehicle owners may desire to drive their vehicle with particular engine and operating configurations. Vehicle owners may take their vehicle to special mechanics or provide particular specifications to a vehicle manufacture to configure their vehicle to their liking. Vehicle owners may also operate the vehicles in many different environments. Vehicle owners may want to tune their vehicle based on which environment the vehicle is operated in. Additionally, vehicle owners may want to prohibit others from operating their vehicles recklessly or irresponsibly.

SUMMARY

In an embodiment, a method of profiling a vehicle is disclosed. The method comprises receiving a signal, by a server, identifying one or more vehicle operating parameters. The method further comprises associating the signal identifying one or more vehicle operating parameters with a mobile device. The method further comprises identifying a profile package based on the identification of the one or more vehicle operating parameters, wherein the profile package comprises at least the one or more vehicle operating parameters. The method further comprises receiving a signal, by the server, associating the mobile device with a head unit. The method further comprises transmitting the profile package associated with the mobile device via the head unit to one or more controllers, wherein the profile package configures one or more controllers to a specific set of one or more vehicle operating parameters, wherein the one or more controllers govern the behavior of one or more vehicle components. The method further comprises activating the specific set of one or more vehicle operating parameters of the profile package in response to detecting that the mobile device is disposed at a predetermined position.

In an embodiment, a method profiling a mobile device is disclosed. The method comprises detecting, by a head unit, one or more environmental parameters. The method further comprises receiving a signal, by a server, from the head unit, identifying the one or more environmental parameters and the time the head unit detected the one or more environmental parameters. The method further comprises associating, by the server, the one or more environmental parameters with a mobile device by identifying that the mobile device was in a predetermined position at the time the head unit detected the one or more environmental parameters. The method further comprises identifying a profile package based on the identification of the one or more environmental parameters, wherein the profile package comprises one or more vehicle operating parameters comprising the one or more environmental parameters. The method further comprising receiving a signal, by the server, associating the mobile device with the head unit. The method further comprises transmitting the profile package associated with the mobile device via the head unit to one or more controllers, wherein the profile package configures one or more controllers to a specific set of one or more vehicle operating parameters, wherein the one or more controllers govern the behavior of one or more vehicle components. The method further comprises activating the specific set of one or more vehicle operating parameters of the profile package in response to detecting that the mobile device is disposed at the predetermined position.

In an embodiment, a method implementing vehicle operating parameters is disclosed. The method comprises associating, by a server, a head unit with a mobile device. The method further comprises identifying one or more vehicle operating parameters in response to associating the head unit with the mobile device, wherein the one or more vehicle operating parameters are identified by a server. The method further comprises identifying a profile package based on the identification of the one or more vehicle operating parameters, wherein the profile package comprises the one or more vehicle operating parameters. The method further comprises transmitting the profile package associated with the mobile device via the head unit to one or more controllers, wherein the profile package configures one or more controllers to a specific set of one or more vehicle operating parameters, wherein the one or more controllers govern the behavior of one or more vehicle components. The method further comprises activating the specific set of one or more vehicle operating parameters of the profile package in response to detecting that the mobile device is disposed at one or more predetermined position.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
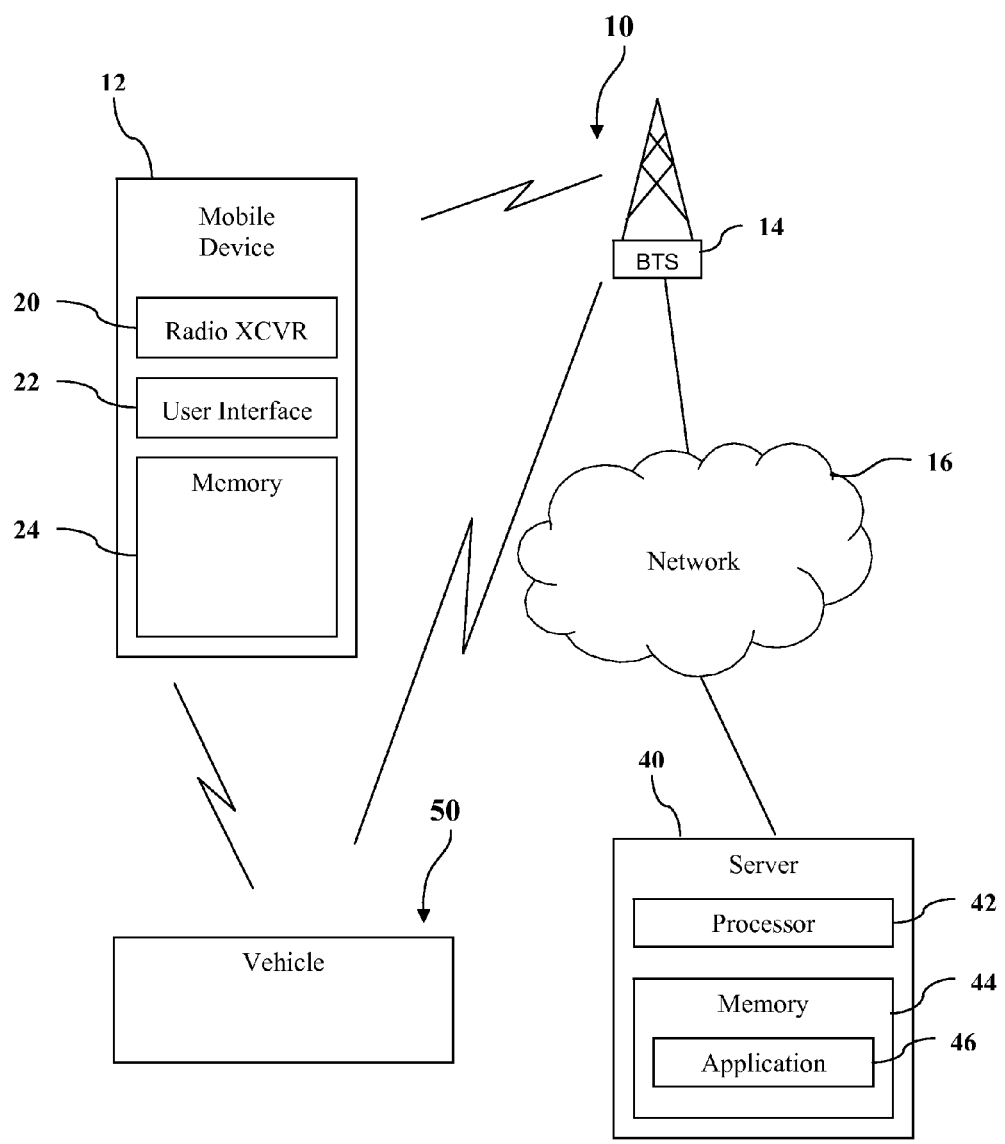
FIG. 1A is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Methods of configuring performance parameters of a vehicle via a mobile device are described. A method of configuring performance parameters of a vehicle may allow an automobile owner to enhance his or her automobile with custom parameters suited for a particular driving style, possibly for a selected duration. For example, the automobile owner may own an automobile with a head unit. The head unit may comprise a transceiver for communicating with a server and a mobile device. The head unit may also be connected with components of the automobile so that the head unit may send signals to the automobile components to configure and/or tune the components in accordance with the automobile owner's specifications. The automobile owner may select one or more vehicle operating parameters and send a signal to the server to select a profile package comprising on the vehicle operating parameters. In an embodiment, the automobile owner may send the signal selecting and/or defining one or more vehicle operating parameters via his/her mobile device and the server may associate the one or more vehicle operating parameter with the mobile device based on the received signal. Vehicle operating parameters, for example, may restrict the automobile from exceeding a specified speed limit. For example, the head unit may store a maximum speed parameter in an electronic engine control component and the electronic engine control component may limit engine RPM to prevent vehicle speed exceeding the maximum speed. Additionally, the profile package may comprise vehicle operating parameters. For example, a fuel economy profile package may comprise the speed restriction among other parameters. Thus, when the fuel economy profile package is installed on the head unit, the automobile may not be able to exceed a specified speed limit. Additionally, an association may be made between the automobile owner's mobile device, the head unit of the owner's automobile, and the one or more vehicle operating parameter selections. Thus, when the mobile device of the automobile owner is in a predefined and/or predetermined position, such as located about in the driver's seat or about in the front seat of the owner's automobile or even simply about inside or proximate to the owner's automobile, the server may identify the relative positions of the head unit and the mobile device and send the profile package to the head unit. In an embodiment, the head unit may activate the profile package in response to receiving the profile package. In an embodiment, the head unit may activate the profile package in response to detecting that the mobile device is in the predetermined position. In an embodiment, when the mobile device of the automobile owner is no longer at the predetermined position, for example, when the automobile owner exits the automobile, the profile package may be deactivated on the head unit and the automobile may return to standard and/or previous operating parameters and remain until a change of driver is detected, needless of deactivations.

A method for configuring performance parameters of a vehicle via a mobile device may allow a server to enhance an automobile owner's automobile with custom parameters suited for the automobile owner's driving style. For example, the automobile owner may own an automobile with a head unit as previously described. The automobile owner may drive his/her automobile aggressively (i.e. accelerating the automobile quickly and driving the automobile at high speeds). The head unit may detect one or more environmental parameters such as quick gear shifting by the transmission and high speeds. For example, speed sensors coupled to a car area network (CAN) bus may transmit speed data that the head unit receives and processes. The head unit may send a signal to a server indicating the aggressive driving of the automobile owner. Additionally, the server may associate the mobile device of the automobile owner with the aggressive driving by detecting that the automobile owner's mobile device is at a predetermined position, such as about in the driver seat and/or about in the front seat, at the time the head unit detected the aggressive driving. The server may identify and install on the head unit one or more profile packages comprising the environment parameters detected by the head unit with one or more vehicle operating parameter, for example, allowing the automobile to switch gears faster and adjusting the fuel to air ratio to increase the automobile power and speed. The server may also receive a signal associating the automobile owner's mobile device with the head unit of the automobile. Thus, whenever the mobile device (i.e. the automobile owner) is in the predetermined position, such as the driver's seat, the head unit may activate the aggressive driving profile. In an embodiment, when the mobile device is removed and thus not in the predetermined position, the automobile may operate using normal or original parameters.

A method of configuring vehicle operating parameters may allow an automobile owner to configure one or more vehicle operating parameters when someone else drives the automobile owner's automobile. For example, parents may allow their sixteen year old son to drive the family car. The parents may provide a signal to a server indicating an association between a head unit located on the family car with their son's mobile device. The parents may also associate one or more vehicle operating parameters such as limiting the speed of the family car to sixty miles per hour with the son's mobile device and direct a server to transmit the profile package comprising the vehicle operating parameter to the head unit of the family car. Thus, when the son sits in a predetermined position, for example, in a position that correlates with the driver's seat or more generally that correlates with the front seat or seats in the family car, the profile package is activated on the family car preventing the son from driving faster than sixty miles per hour. In an embodiment, when the parents drive the car again, for example, the car returns to the original or normal operating conditions.

Turning now to FIG. 1A, a communication system 10 is described. The system 10 comprises a mobile communication device 12, a base transceiver station (BTS) 14, a network 16, a service awareness provisioning server 40, and vehicle 50. The mobile communication device 12 may be a mobile phone, a personal digital assistant (PDA), a media player, or other communication enabled portable electronic device. In an embodiment, the mobile communication device 12 may be implemented as a handset. Details of handsets are discussed further hereinafter. The base transceiver station 14 provides a communication link to the mobile communication device 12 and couples the mobile communication device 12 to the network 16. In an embodiment, the base transceiver station 14 provides a wireless communication link to the mobile communication device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the communication system 10 may comprise any number of base transceiver stations 14 and any number of mobile communication devices 12. The network 16 may be a public communication network, a private communication network, or a combination thereof.

The mobile device 12 may comprise a radio transceiver 20, a user interface 22, and a memory 24. The mobile device 12 may be a mobile phone, a personal digital assistant (PDA), a media player, or other communication enabled mobile communication device. In an embodiment, the mobile device 12 may be implemented as a handset. Details of handsets are discussed further hereinafter. In an embodiment, the memory 24 may store one or more data packages. In an embodiment, data packages comprise application data, logic instructions, and/or the like. For example, a data package application for selecting one or more vehicle profiles may be stored in memory 24.

The radio transceiver 20 is configured to establish a wireless communication link with the BTS 14. The BTS 14 may communicatively couple the radio transceiver 20 and/or the mobile device 12 to the network 16 and to devices that are connected to the network 16, for example the trusted security zone server 40. In an embodiment, the radio transceiver 20 and the BTS 14 establish a wireless communication link according to one of a code division multiple access (CDMA) wireless protocol, a global system for mobile communication (GSM) wireless protocol, a long term evolution (LTE) wireless protocol, a worldwide interoperability for microwave access (WiMAX) wireless protocol, or another wireless communication protocol.

The user interface 22 of the mobile device 12 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, or phone call audio) to a user of the mobile device 12. The microphone may receive voice and/or audio from a user and/or communicate audio to a user. In an embodiment, a user may utilize the user interface 22 to communicate with the mobile device 12, for example, to initiate the execution of a device application and/or a secure application. Additionally, a user may receive communication from the mobile device 12 via the user interface 22, such as messages, emails, contact information, caller identification, call history, internet access, etc. A user may additionally employ the user interface 22 for viewing and/or listening to media such as music, movies, shows, videos, photos, games etc.

The server 40 may comprise a processor 42, a memory 44, and an application 46 stored in the memory 44. The server 40 may also comprise a plurality of processors located in a plurality of computers. Computers are discussed in more detail hereinafter. The application 46, when executed by the processor 42 of the service awareness provisioning server 40, may receive one or more messages from a mobile device 12 and/or a vehicle 50 (e.g. the head unit 51 of the vehicle 50) and/or send one or more messages to the mobile device 12 and/or a vehicle 50 (e.g. the head unit 51 of the vehicle 50, to be discussed further herein). For example, in response to receiving a request from a head unit 51 of a vehicle 50, the application 46 may identify at least one profile package in the memory 44 that comprises parameters identified in the request. The application 46 may link a profile package with the mobile device 12 and/or a particular vehicle 50 by accessing a look-up table and/or a data store (not shown), for example. One of ordinary skill in the art will appreciate after reading this disclosure the various ways the server 40 may identify a particular request for a profile package.

It should be noted that the server 40 may also reside in a distribution outlet or warehouse, and that some or all provisioning events may be completed in the distribution outlet. This would allow branding and customization to be accomplished prior to sending a plurality of mobile devices 12 to a retail point of sale or a large enterprise customer, whom all want to sell and/or use the mobile device on a particular service brand network, for example.

Figure 1B:
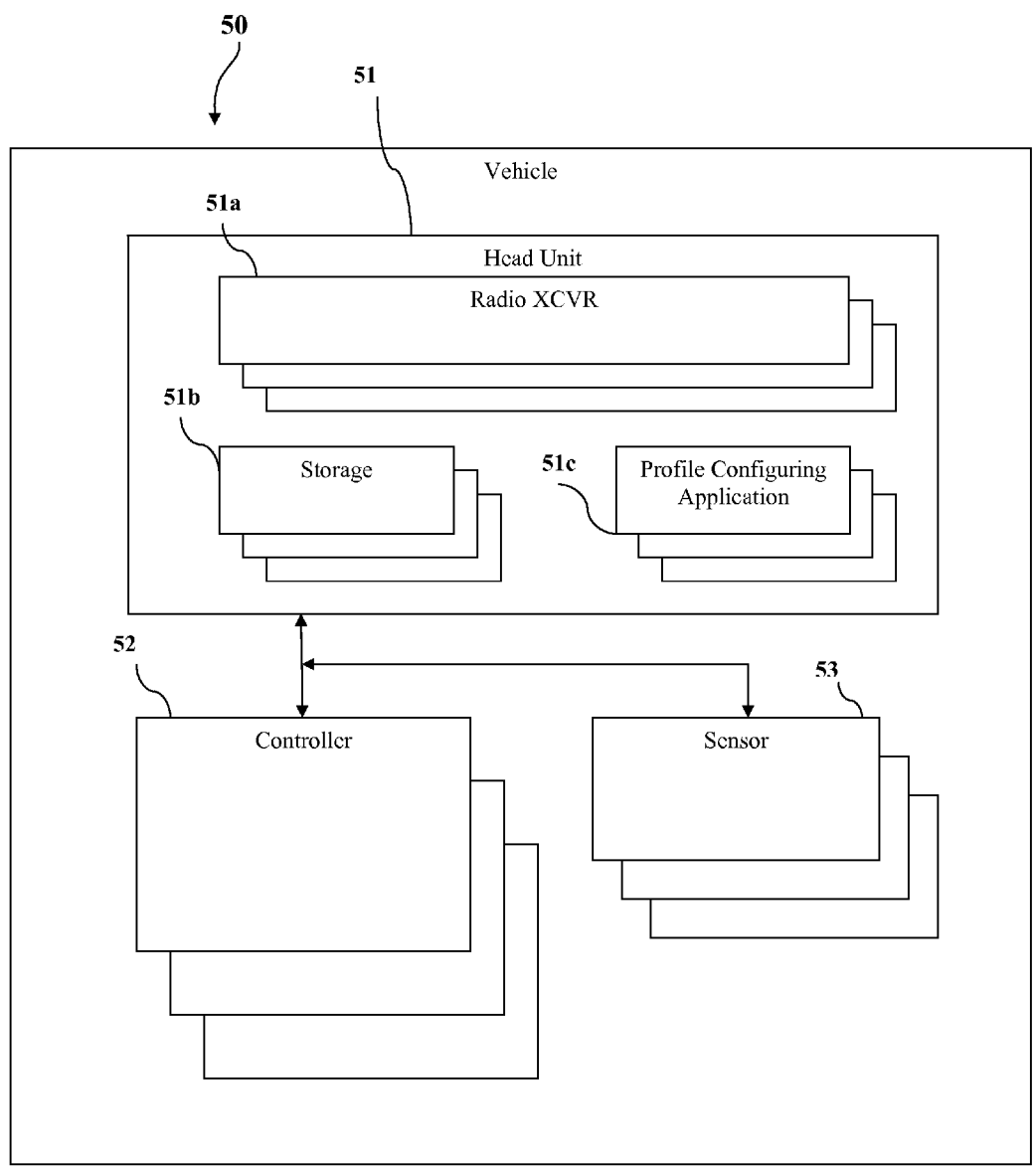
FIG. 1B is a block diagram of a vehicle according to an embodiment of the disclosure.

The vehicle 50 may generally be associated with a vehicle such as a boat, airplane, automobile, truck, all-terrain-vehicle (ATV), and/or the like. Turning to FIG. 1B, the vehicle 50 may generally comprise a head unit 51, a controller 52, and one or more sensors 53. The head unit 51 may comprise a radio 51a, storage 51b, and a profile configuration application 51c. In an embodiment, the head unit 51 is mounted within the vehicle 50. For example, a head unit, such as head unit 51, may be mounted within an automobile. The head unit 51 may be configured to receive and/or store one or more profile packages, for example in storage 51b, comprising one or more vehicle operating parameters as will be disclosed herein. For example, one or more vehicle operating parameters may have been selected by the vehicle driver on the vehicle driver's mobile device. A signal may be transmitted from the mobile device, a BTS, and/or the like, to the radio 51a identifying profile packages comprising selected vehicle operating parameters. In an embodiment, vehicle operating parameters may comprise at least one of max horsepower limit, max torque limit, max speed limit, automobile emission profiles, race/sport package profiles, economy/normal driving operation profiles, electronic variable speed value timings (CAM shifts profiles) that remaps horsepower and torque curves based on electronic cam lobe profiles. The profile configuration application 51c may detect the presence of a particular mobile device using for example, near field communication, WiFi communication, GPS, and/or the like. In response to detecting the particular mobile device, for example, in a particular position relative to the head unit 51, the head unit 51 may transmit an appropriate profile package comprising one or more vehicle operating parameters from the storage 51b to configure the one or more controllers 52. In an embodiment, a signal may transmit one or more profile packages to the one or more controllers 52 through the head unit 51. The one or more profile packages may configure one or more controllers 52 to a specific set of one or more vehicle operating parameters, wherein the one or more controllers govern the behavior of one or more vehicle components.

In an embodiment, the controllers 52 may comprise an engine controller which may adjust engine parameters, a transmission controller which may adjust transmission parameters, a suspension controller which may adjust the suspension parameters, and/or the like. For example, a profile package for automobile racing may comprise operating parameters of high engine performance, quick gear shifting, and tight suspension. The head unit 51 may detect a mobile device, associated with the racing profile, for example, using near field communication and implement the racing profile package in response to detecting the mobile device. The head unit 51 may then send the vehicle operating parameters to the appropriate controllers: engine performance to the engine controller, faster gear shifting to the transmission controller, and tight suspension to the suspension controller. Sensors, such as sensor 53 may be linked to appropriate controllers so that when vehicle operating parameters are sent to a controller(s) 52, the controller(s) 52 may send a signal to the appropriate sensors to implement the operating parameters. For example, the tight suspension operating parameter may be sent to the suspension controller. The suspension controller may be linked to sensors on components of the vehicle suspension which may be manipulated to adjust the suspension. Thus, when implementing tight suspension, one or more sensors may direct the adjustment of the suspension. In an embodiment, if the profile package comprises, for example, tight suspension and high engine performance, but the vehicle does not have a suspension controller and/or suspension sensors, the head unit may implement the engine performance parameters but not the suspension parameters. Vehicle components may comprise air and/or fuel intake valves, drive shafts, wheels and/or tires, propellers, fans, fuel tanks, air condition and/or heating systems, engines, pistons, power steering components, suspension components, lift and drag flaps, and/or the like.

In an embodiment, the sensors, such as sensor 53, may also detect environmental parameters. In this embodiment, the sensor may send a signal, for example through the one or more controllers, to the head unit, where the head unit 51 may identify one or more profile packages comprising operating parameters appropriate for the environmental parameters. For example, the head unit 51 may be capable of receiving a signal from a sensor associated wet driving conditions. The head unit may then locate one or more profile packages so that the automobile is better suit for safe wet driving, for example, setting a maximum automobile speed. In an embodiment, the head unit 51 may have appropriate profile packages stored in the storage 51b. In an embodiment, the head unit 51 may send a signal to server, such as server 40, requesting a profile package.

Figure 2:
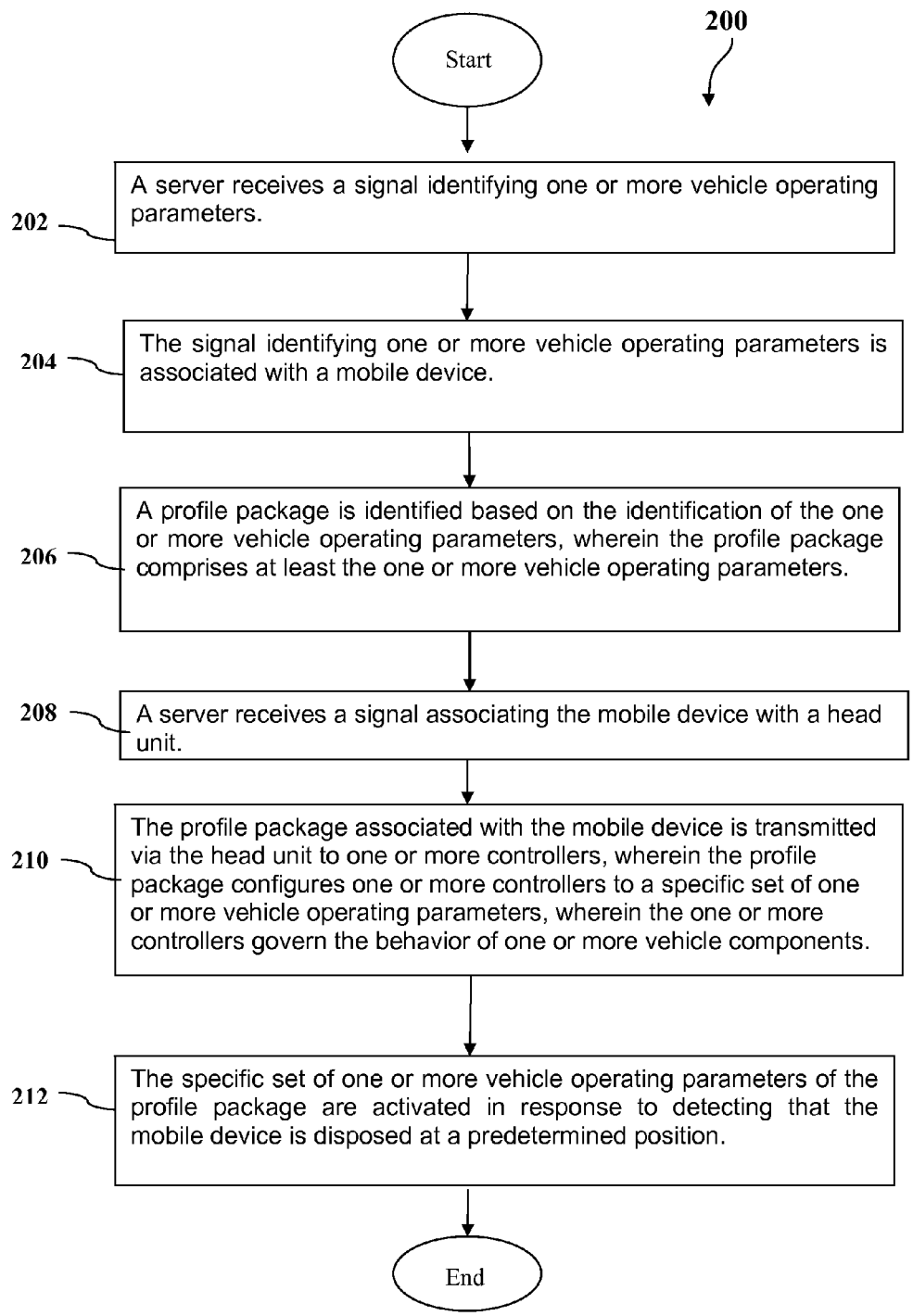
FIG. 2 is a flow chart of a method according to an embodiment of the disclosure.

In FIG. 2, a method 200 is described. At block 202, a signal is received identifying one or more vehicle operating parameters. In an embodiment, vehicle operating parameters may comprise maximizing vehicle performance, maximizing fuel economy, tightening or loosening steering and or suspension, maximizing horse power limits, maximizing torque limits, maximizing speed and/or acceleration limits, customizing speed and/or acceleration rates, adjusting seat positions, adjusting the steering wheel, adjusting vehicles mirrors, and/or the like. In an embodiment, vehicle operating parameters may also comprise environmental parameters such as weather, temperature, altitude, humidity, road conditions, time of day, location, and/or the like. One of ordinary skill in the art will appreciate after reading this disclosure the various embodiments comprising vehicle operating parameters.

In an embodiment, a server may receive the signal from a mobile device identifying the one or more vehicle operating parameters. For example, a speed boat owner may desire to operate her speed boat while conserving the optimal amount of gasoline. The speed boat owner may send a signal, via her mobile device, to a server identifying optimal fuel economy as a vehicle operating parameter. In another example, a vehicle owner may be driving into the Rocky Mountains. The vehicle owner may send a signal, via his mobile device, to a server identifying maximizing torque limits, high altitude, and icy road conditions as vehicle operating parameters.

In an embodiment, a server may receive a signal from a stationary electronic device identifying the one or more vehicle operating parameters. The stationary electronic device may comprise a personal computer, a kiosk, or the like. For example, a motorcycle owner may desire to operate his motorcycle while conserving the optimal amount of gasoline. The motorcycle owner, for example, may access a webpage, via a personal computer, select one or more vehicle operating parameters, and send a signal over the internet to a server identifying optimal fuel economy as a vehicle operating parameter.

At block 204, the signal identifying one or more vehicle operating parameters may be associated with a mobile device. Associating the signal identifying one or more vehicle operating parameters with a mobile device may comprise providing identification associated with the mobile device. Identification may comprise a mobile number, a mobile device SKU number, and/or the like to associate the signal identifying one or more vehicle operating parameters with a mobile device. Associating the signal identifying one or more vehicle operating parameters with a mobile device allows a server, for example, to associate the one or more vehicle operating parameters with a mobile device.

In an embodiment, a server may receive a second signal associating the signal identifying one or more vehicle operating parameters with the mobile device. For example, a mobile device may send a signal to a server identifying maximum vehicle performance as a vehicle operating parameter. The mobile device may then send out a second signal indicating to the server that the signal identifying maximum vehicle performance as a vehicle operating parameter was from mobile device "A".

In an embodiment, the signal received by the server identifying one or more vehicle operating parameters may comprise an association signal associating the signal identifying one or more vehicle operating parameters with the mobile device. For example, a mobile device may send a signal to a server identifying maximum vehicle performance as a vehicle operating parameter and also identify the phone number of the mobile device sending the signal.

In an embodiment, a server may receive a signal from a stationary electronic device identifying the one or more vehicle operating parameters. The stationary electronic device may display an input entry screen allowing a user to provide one or more vehicle operating parameters. The stationary electronic device may request an operator code (e.g. username and password) as well as mobile device identification, such as a mobile communication device number, before providing vehicle operating parameters. After selecting vehicle operating parameters, the stationary electronic device may send a signal, for example, to a server identifying one or more vehicle operating parameters and associating the signal and/or the vehicle operating parameters with the mobile communication device identification.

At block 206, a profile package is identified based on the identification of the one or more vehicle operating parameters. In an embodiment, a server comprising a data memory storage storing a plurality of profile packages may identify one or more profile packages. For example, a vehicle owner may be driving in wet road conditions. The vehicle owner may identify the vehicle operating parameter of traction control and transmit a signal via his mobile device to a server. The server may identify one or more profile packages for vehicle traction control based on the identification of the traction control operating parameter.

The one or more profile packages identified by the server may comprise at least the operating parameter. For example, the one or more profile packages identified by the server for vehicle traction control may comprise the traction control operating parameter. The server may identify a profile package for off-roading (e.g. driving a vehicle on unpaved and/or muddy surfaces) comprising a traction control operating parameter and a maximum torque operating parameter. The server may also identify a profile package for snow driving (i.e. driving through snow) comprising a traction control operating parameter and a speed governing operating parameter. Additionally, the server may identify a profile package for heavy rain driving (i.e. driving through heavy rain) comprising a traction control operating parameter and a tighter suspension operating parameter. While each of these profile packages may comprise operating parameters which are different from each other, tailored to fit a specific purpose, and which are not one of the identified vehicle operating parameters, all of these profile packages comprise the operating parameter of traction control and thus comprise at least the identified operating parameter. In another example, a vehicle owner may want to race her automobile. The vehicle owner may identify the vehicle operating parameter of maximum speed and maximum acceleration and transmit a signal via her mobile device to a server. The server may identify one or more profile packages for maximum speed and maximum acceleration based on the identification of the maximum speed operating parameter and maximum acceleration operating parameter. One or more profile packages identified by the server for maximum speed and maximum acceleration may comprise the maximum speed and maximum acceleration operating parameters. The server may identify a profile package for drag strip racing (e.g. racing at high speeds in a straight line) comprising the maximum speed and maximum acceleration operating parameters as well as a rear wheel power transfer operating parameter. The server may also identify a profile package for circular track driving (i.e. driving around an oval or rounded track and turning in only one direction) comprising the maximum speed and maximum acceleration operating parameters as well as an air conditioning deactivation operating parameter. Additionally, the server may identify a profile package for formula one style racing (i.e. driving on a track which turns both left and right) comprising the maximum speed and maximum acceleration operating parameters as well as a tight suspension operating parameter. Similar to the previous example, while each of these profile packages may comprise operating parameters which are different from each other, tailored to fit a specific purpose, and which are not one of the identified vehicle operating parameters, all of these profile packages comprise the operating parameters of maximum speed and maximum acceleration and thus comprise at least the identified operating parameters.

In an embodiment, a vehicle operator may select a profile package comprising at least the one or more vehicle operating parameters. The server may transmit a list of one or more profile packages comprising the one or more operating parameters to the mobile device. The mobile device may display the list of profile packages on a mobile device display. The vehicle operator (e.g. the user of the mobile device) may identify a profile package that comprises at least the one or more vehicle operating parameters the operator selected. For example, the server may transmit a list of profile packages comprising the maximum speed and maximum acceleration operating parameters to a mobile device. The mobile device may then display a profile package for drag strip racing, a profile package for circular track driving, and a profile package for formula one style racing. Each of the profile packages may provide unique and specific specifications for a vehicle operator to review. The vehicle operator may then select, through the mobile device, one of the one or more profile packages comprising at least the maximum speed and maximum acceleration operating parameters.

In an embodiment, the server may identify one or more profile packages based on the identification of one or more vehicle operating parameters. Similar to previous embodiments, the one or more profile packages may comprise the one or more vehicle operating parameters. The server may select one of the profile packages based on popularity, geographic location of the mobile device and/or vehicle operator, the operating habits of the vehicle operator, and/or the like.

In an embodiment, a profile package may be created based on the identification of one or more vehicle operating parameters. The server may receive a signal identifying one or more vehicle operating parameters. Based on the one or more vehicle operating parameters, the server may create a custom profile package comprising the one or more vehicle operating parameters. For example, a race car driver may be about to race on a circular track in wet and windy conditions. The race car driver may also be on a budget and must conserve as much gasoline as possible to finish the race. The race car driver may send parameters including racing on a circular track, driving on a wet surface, high winds, and fuel economy. In an embodiment, the race car driver may select an icon or a tab, for example, identifying that the race car driver wants a custom profile package. The server may receive the signal identifying the sent parameters and provide a custom profile package comprising the sent parameters. In an embodiment, the server may provide a custom profile package which comprises only the sent parameters (e.g. only racing on a circular track, driving on a wet surface, high winds, and fuel economy). In an embodiment, the server may provide profile packages in addition to the custom profile package comprising the sent parameters.

At block 208, a signal is received, for example, by a server, associating a mobile device with the head unit. In an embodiment, the head unit may provide signals to various components of a vehicle in order to configure adjustments and/or modifications of vehicle parameters. The various vehicle components may comprise fuel injectors, air-intake manifolds, power steering, vehicle suspension, ventilation systems, and/or the like. As one of ordinary skill in the art would appreciate these adjustments and/or modifications of vehicle operating parameters may be performed by updating and/or writing to component controllers, for example, on an engine controller, suspension controller, steering controller, and/or the like. In an embodiment, the mobile device user may provide mobile device identification and head unit identification through a communication device in order to associate a mobile device with the head unit. In an embodiment, mobile device identification may comprise a mobile communication device number, a mobile device SKU number, and/or the like. In an embodiment, head unit identification may comprise a head unit identification number and/or vehicle identification associated with the head unit (e.g. the head unit installed in the vehicle). In an embodiment, vehicle identification may comprise a vehicle identification number, a license plate number, vehicle registration number, and/or the like.

In an embodiment, the mobile device user may provide mobile device identification and head unit identification through a user interface at computer, kiosk, and/or the like. For example, a mobile device user may want to implement the vehicle operating parameter of fuel economy with his automobile. The mobile device user may open a web page facilitating the profiling of vehicles as disclosed herein. The mobile device user may provide on the web page his mobile device number identifying his mobile device as well as the vehicle identification number of his automobile identifying the head unit of his automobile with which he wants to implement the vehicle operating parameter of fuel economy. Once these inputs are entered, the mobile device user may transmit a signal through the web page, via a network, which is received, for example, by a server, associating the mobile device user's mobile device with a head unit of the user's automobile.

In an embodiment, the mobile device user may provide mobile device identification and head unit identification through a mobile device, such as for example, the user's mobile device. Similar to previous embodiments, the mobile device user may provide a vehicle identification associated with a head unit, for example, mounted with the vehicle, and/or the like into the mobile device. The mobile device may send a signal received, for example, by a server, identifying the head unit and the mobile device sending the signal and associating the mobile device with the head unit. For example, a mobile device user may want to implement the vehicle operating parameter of fuel economy with his automobile. The mobile device user may enter into his mobile device the vehicle identification number of his automobile identifying the head unit of an automobile with which he wants to implement the vehicle operating parameter of fuel economy. Once these inputs are entered, the mobile device user may transmit a signal through the mobile device, via a network, which is received, for example, by a server, associating the mobile device user's mobile device with the user's automobile. Thus, by transmitting the signal through the mobile device the server will automatically associate the head unit identified by the head unit identification with the mobile device.

At block 210, one profile package of a plurality of profile packages identified based on the identification of the one or more vehicle operating parameters may be transmitted to the head unit associated with the mobile device. The profile package may configure the head unit and/or one or more controllers to a specific set of one or more vehicle operating parameters. In an embodiment, the one or more vehicle operating parameters may be transmitted to one or more controllers via the head unit. The one or more controllers may govern the behavior of one or more vehicle components. In an embodiment, the profile package may be transmitted wirelessly directly to the head unit. In an embodiment, the head unit may comprise a wireless transceiver which enables the head unit to send and receive data wirelessly, for example, with a server. For example, a mobile device owner may desire a fuel economy profile package for her vehicle. A server may transmit the fuel economy profile package directly to the head unit of the mobile device owner's vehicle wirelessly via a wireless network. In an embodiment, the mobile device owner may transmit a profile package to the head unit via a wire line connection.

In an embodiment, the profile package may be transmitted wirelessly to the head unit via the mobile device. For example, the head unit may use the mobile device to receive the transmission of the profile package. The mobile device may then relay the profile package to the head unit using, for example, short range wireless communication. In an embodiment, the head unit may receive the transmission of the profile package via the mobile device by connecting the mobile device to the head unit via a wire line. For example, the mobile device may be inserted into a docking station located within and/or near the head unit and/or the vehicle associated with the head unit. Once the mobile device is docked, the mobile device may transmit the profile package from the server to head unit.

At block 212, the specific set of vehicle operating parameters of the profile package may be activated in response to detecting that the mobile device is disposed at a predetermined location. In an embodiment, the predetermined position may comprise a predetermined distance from the head unit. For example, GPS technology, WiFi, and/or near field communication may locate the positions of both the head unit and the mobile device. When the mobile device is disposed within a predetermine distance of the head unit, the server and/or head unit may receive a signal indicating that the mobile device is within the predetermined distance of the head unit. In an embodiment, if the server receives a signal indicating that the mobile device is within the predetermined distance from the head unit, the server may transmit a signal to the head unit indicating so. After the head unit receives a signal indicating that the mobile device is within the predetermined range of the head unit, the head unit may activate the specific set of one or more vehicle operating parameters of the profile package. In an embodiment, the head unit may detect that the mobile device is within the predetermined range by sending and/or receiving one or more signal directly with the mobile device. One of ordinary skill in the art would appreciate the various systems and/or methods by which the distance between the head unit and the mobile device may be determined. In an embodiment, the predetermined range may be between about 1 foot and 1000 feet.

In an embodiment, the predetermined position may comprise one or more specific locations relative to the head unit. For example, GPS technology may determine the locations of both the mobile device and the head unit. GPS technology may determine that the mobile device is located in the driver's seat of the vehicle based on the relative locations of both the mobile device and the head unit. In response to the determination that the mobile device is located in the driver's seat of the vehicle, the server and/or head unit may receive a signal indicating that the mobile device is in the driver's seat of the vehicle. In an embodiment, if the server receives a signal indicating that the mobile device is in the driver's seat of the vehicle, the server may transmit a signal to the head unit indicating so. After the head unit receives a signal indicating that the mobile device is in the driver's seat of the head unit, the head unit may activate the specific set of one or more vehicle operating parameters of the profile package. In an embodiment, the head unit may detect that the mobile device is disposed in the predetermined position by sending and/or receiving one or more signals directly with the mobile device. One of ordinary skill in the art would appreciate the various systems and/or methods by which the position of the mobile device may be determined.

In an embodiment, the predetermined position may comprise engagement with a wire line directly connected with the head unit. For example, the head unit may comprise one or more USB ports so that the mobile device may directly connect to the head unit. The mobile device may be connected to the head unit via the USB port and/or a wire line. In response to detecting the a mobile device is connected to the head unit via a wire line, the mobile device may send a signal via the wire line to the head unit indicating that the mobile device is the mobile device associated with the head unit for activating a vehicle profile package. The head unit may verify that the mobile device is associated with the head unit and a profile package and activate the set of one or more vehicle operating parameters of a profile package. In an embodiment, if the profile package is transmitted from the server via the mobile device to the head unit, docking the mobile device may allow the transmission of the profile package to the head unit as well as the triggering of the activation of the specific set of one or more vehicle operating parameters.

In an embodiment, after activating the specific set of one or more vehicle operating parameters of the profile package, the vehicle may be operated while maintaining and/or utilizing the specific set of one or more vehicle operating parameters. For example, the mobile device owner may activate a fuel economy profile package on the mobile device owner's vehicle. The fuel economy profile package may comprise the operating parameters of deactivation of the air conditioner, a maximum vehicle speed, and a maximum acceleration rate. The mobile device owner may then operate the vehicle while the air conditioner is deactivated, the vehicle is not able to exceed 55 miles per hour, and the vehicle is not able to increase its speed from zero miles per hour to 55 miles per hour in less than 15 seconds.

In an embodiment, multiple profile packages each profile package comprising sets of one or more vehicle operating parameters may be maintained while the vehicle is operating. For example, the mobile device owner may have identified an anti-automobile theft profile package and a fuel economy profile package and activated both profile packages with the vehicle. The anti-automobile theft package may activate vehicle operating parameters such as enabling the operation of the fuel injectors and enabling the turning of the steering wheel. The fuel economy package may activate vehicle operating parameters comprising a maximum automobile speed. Thus, while the vehicle is operating the vehicle maintains a speed at or below a maximum speed and enables the operation of the fuel injectors and the turning of the steering wheel.

In an embodiment, the set of one or more vehicle operating parameters may be deactivated in response to detecting that the mobile device is no longer located at the predetermined position. In an embodiment, the one or more vehicle operating parameters may be deactivated in response to detecting that the mobile device is no longer within a predetermined distance from the head unit. In an embodiment, the one or more vehicle operating parameters may be deactivated in response to detecting that the mobile device is no longer within a predetermined location relative to the head unit. In an embodiment, the one or more vehicle operating parameters may be deactivated in response to detecting that the mobile device is no longer engaged with a wire line directly connected with the head unit. Additionally, in an embodiment, the set of one or more vehicle operating parameters may not be deactivated until a different driver (i.e. a different mobile device) is identified.

In an embodiment, the one or more vehicle operating parameters may be deactivated in response to detecting that the mobile device is not located within a predetermined geographic area. For example, the mobile device user may specify that a racing profile package may be activated with his vehicle when the mobile device is located at a specified race track. The server may identify that mobile devices receive service through a particular base transceiver station (BTS) when the mobile device is located at the race track. The mobile device may receive mobile service through the mobile on the particular BTS while the mobile device is at the race track. However, the mobile device user may drive the vehicle away from the race track (i.e. drive the vehicle on public roads and/or highways) and maintain service through another BTS. Because the mobile device accompanying the mobile device user is no longer located at the specified race track and thus is no longer receiving service through the particular BTS, the race profile package comprising a set of one or more vehicle operating parameters may automatically be deactivated on the mobile device owner's vehicle.

In an embodiment, the set of one or more vehicle operating parameters may be deactivated in response to receiving a signal from the mobile device deselecting the specific set of one or more vehicle operating parameters of the profile package. For example, the mobile device may display a list of profile packages currently activated and enable the mobile device owner to deselect one or more of the currently activated profile packages. The mobile device would then send a signal to the head unit deactivating the profile package in response to deselecting the profile package. In an embodiment, deactivating a profile package may be triggered when activating a profile package that counteracts a currently activated profile package. For example, the mobile device owner may select a profile package for fuel economy which comprises the vehicle operating parameter of limiting the vehicle to a maximum speed of 55 miles per hour. Subsequently, the mobile device owner may select a profile package for racing (i.e. operating the vehicle above 55 miles per hour). The activation of the subsequent racing profile package may automatically deactivate the fuel economy profile package because the racing profile package may not be able to operate for its intended purpose if the fuel economy package was also activated.

Figure 3:
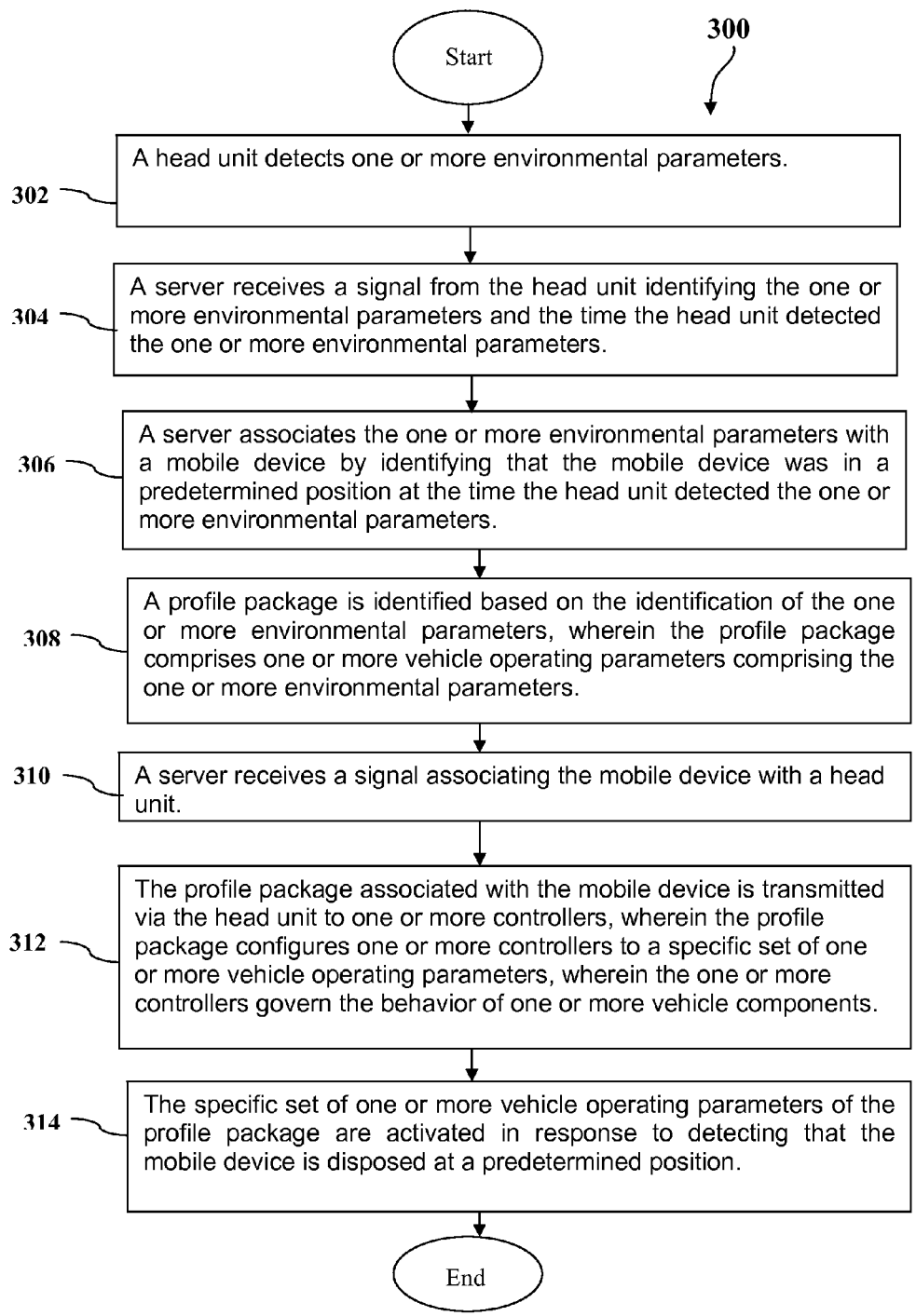
FIG. 3 is a flow chart of a method according to an embodiment of the disclosure.

In FIG. 3, a method 300 is described. At block 302, a head unit detects one or more environmental parameters. Generally, the head unit may detect environmental parameters associated with internal components within the vehicle, parameters reflecting how the vehicle is operated, settings within the vehicle and/or vehicle cabin, and external conditions surrounding the vehicle. For example, the head unit may detect that the vehicle is accelerating often and quickly, that the vehicle is moving at fast speeds, and/or that the road that the vehicle is driving on is wet. In an embodiment, vehicle operating parameters may comprise environmental parameters. One of ordinary skill in the art will appreciate after reading this disclosure the various environmental parameters which may be detected by a head unit.

In an embodiment, the head unit may also record the time when the head unit detected the one or more parameters. For example, the head unit may detect that when a vehicle is operating between 5:00 p.m. and 7:00 p.m., Monday through Friday that the vehicle tends to idle at a greater frequency than normal (i.e. due to weekday rush hour traffic). In another example, the head unit may record the time when it detects the one or more parameters so that a server may correlate the position of a mobile device with the time the parameter was recorded. This example will be discussed in greater detail further herein.

In an embodiment, the head unit may record the location of the vehicle (i.e. the head unit) when the head unit detected the one or more parameters. For example, the head unit may record that the vehicle was located on a beach when four-wheel-drive was activated on the vehicle using GPS and/or by identifying a particular BTS associated with a particular location. One of ordinary skill in the art will readily select a method after reading this disclosure by which a mobile device and/or a head unit may determine its location. In another example, the head unit may record the location of the vehicle when it detects one or more parameters so that a server may correlate the location of the vehicle with the position of the mobile device and with the time the parameter was recorded.

At block 304, a server receives a signal from the head unit identifying the one or more environmental parameters and the time the head unit detected the one or more environmental parameters. For example, the head unit may send a signal through a transceiver to a server identifying the environmental parameters of fast vehicle acceleration and high altitude. The signal may also comprise the time when each of the environmental parameters were detected. For example, the head unit may have detected fast vehicle acceleration at 10:00 p.m. and high altitude at 7:00 a.m. In an embodiment, as will be discussed further herein, providing the time the environmental parameters were detected may allow a server to correlate the time the environmental parameters were detected with a particular mobile device based on the position of the mobile device at the time the environmental parameters were detected. In an embodiment, the server may also receive a signal from the head unit identifying the one or more environmental parameters, the time the head unit detected the one or more environmental parameters, and the location of the head unit at the time the head unit detected the one or more environmental parameters. For example, a server may receive a signal identifying that the head unit detected high engine RPMs at 11:00 a.m. when the head unit was located at a beach. The server may also receive a signal identifying that the head unit detected high engine RPMs at 5:00 p.m. when the head unit was located at a race track.

At block 306, a server associates the one or more environmental parameters with a mobile device by identifying that the mobile device was in the predetermined position at the time the head unit detected the one or more environmental parameters. For example, if the head unit detected fast vehicle acceleration at 10:00 p.m. and sharp turning at 7:00 a.m., but mobile device A was located, for example, proximate to the driver seat of the vehicle, only between the hours of 9:00 p.m. and 11:00 p.m., then an association may be made between mobile device A and fast vehicle acceleration, but not between mobile device A and sharp turning.

In an embodiment, the server associates the one or more environmental parameters with a mobile device by identifying that the mobile device was in the predetermined position at the time the head unit detected the one or more environmental parameters and by identifying the location of the head unit at the time the head unit detected the one or more environmental parameters. For example, a server may receive a signal identifying that the head unit detected high engine RPMs at 11 a.m. when the head unit was located at a beach. The server may also receive a signal identifying that the head unit detected high engine RPMs at 5:00 p.m. when the head unit was located at a race track. A mobile device may have been located, for example, proximate to the driver seat of the vehicle associated with the head unit between 10:00 a.m. and 11:30 a.m. as well as between 1:00 p.m. and 2:00 p.m. when the vehicle was operating on a residential street. Thus, an association may be made between the mobile device, high engine RPM, and the beach, but an association may not be made between the mobile device, high engine RPM, and the residential street. Additionally, in this example, an association may not be made between the mobile device, high engine RPM, and the race track.

At block 308, a profile package is identified based on the identification of the one or more environmental parameters. In an embodiment, a server comprising a data memory storage storing a plurality of profile packages may identify one or more profile packages. For example, a vehicle owner may be driving in wet road conditions. The head unit may identify the environmental parameter of slick driving surfaces and transmit a signal to a server. The server may identify one or more profile packages for slick driving surfaces based on the identification of the slick driving surface environmental parameter.

The one or more profile packages identified by the server comprises one or more vehicle operating parameters comprising the environmental parameter. For example, the one or more profile packages identified by the server for driving on a slick surface may comprise one or more traction control parameters comprising the slick driving surface environmental parameter. The server may identify a profile package for off-roading in the mud (e.g. driving a vehicle on muddy surfaces) comprising a traction control vehicle operating parameter and a maximum torque vehicle operating parameter. The server may also identify a profile package for snow driving (i.e. driving through snow) comprising a traction control vehicle operating parameter and a speed governing vehicle operating parameter. Additionally, the server may identify a profile package for heavy rain driving (i.e. driving through heavy rain) comprising a traction control vehicle operating parameter and a tighter suspension vehicle operating parameter.

At block 310, similar to previous embodiments, a signal is received, for example, by a server, associating a mobile device with the head unit. At block 312, similar to previous embodiments, the profile package associated with the mobile device may be transmitted via the head unit to one or more controllers, wherein the profile package configures one or more controllers to a specific set of one or more vehicle operating parameters, wherein the one or more controllers govern the behavior of one or more vehicle components. At block 314, similar to previous embodiments, the specific set of one or more vehicle operating parameters is activated in response to detecting that the mobile device is disposed at the predetermined position.

In an embodiment, the method may further comprise displaying the identified profile package based on the identification of the one or more environmental parameters and transmitting the profile package to the head unit based on the selection from the display of the profile package. For example, the server may transmit data to a display, for example, on a mobile device, to display one or more profile packages comprising fuel economy. The mobile device owner may then select one of the one or more displayed profile packages comprising fuel economy that best suits the mobile device owner's requirements. The selected profile package may then be transmitted to the head as previously described herein.

Figure 4:
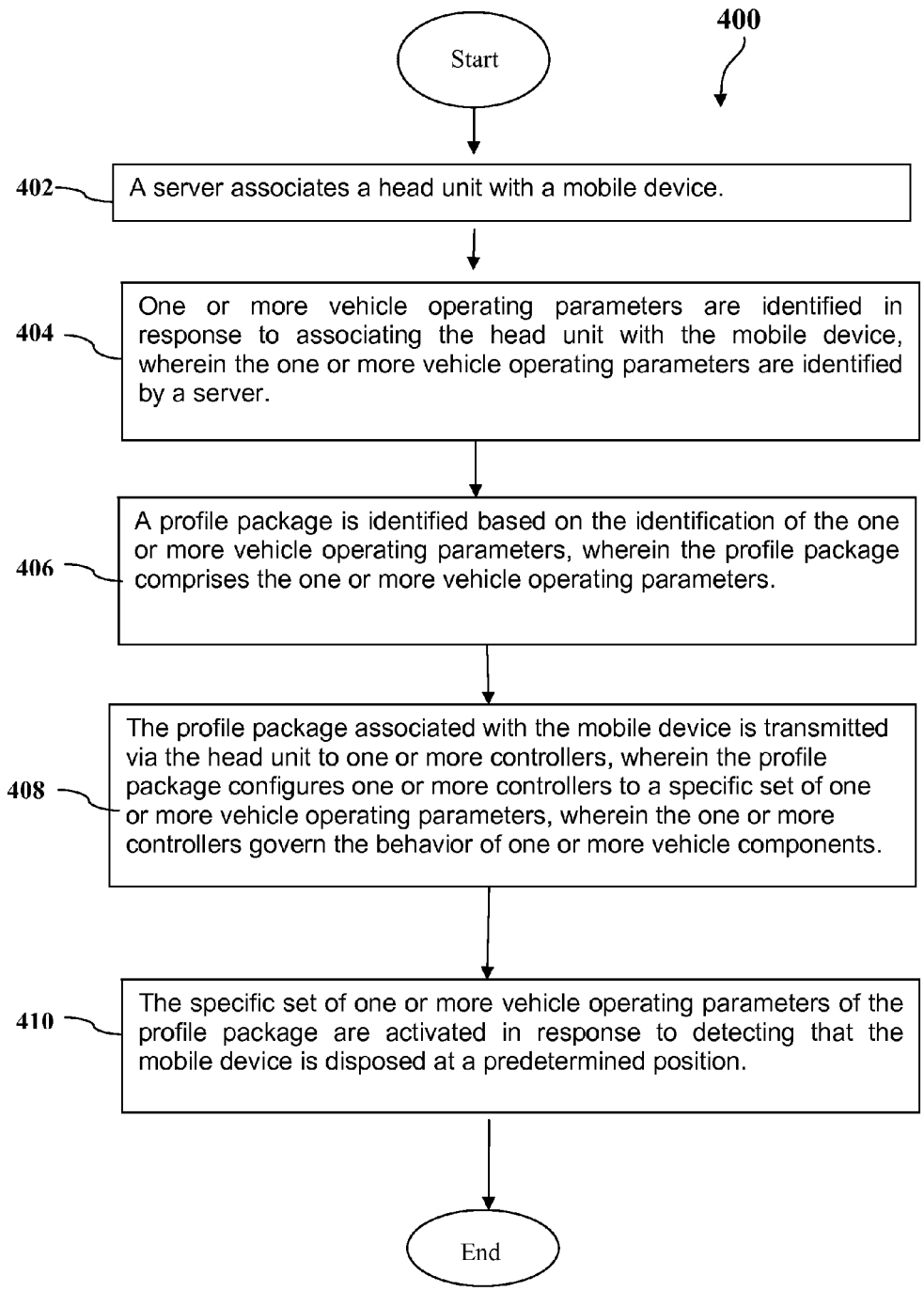
FIG. 4 is a flow chart of a method according to an embodiment of the disclosure.

In FIG. 4, a method 400 is described. At block 402, a server associates a head unit with a mobile device. In an embodiment, a third party, for example, the owner of a fleet of service vehicles, may provide a look-up table that associates mobile devices with head units disposed on each of the service vehicles, such that when any of the listed mobile devices are in a predetermined position, as previously described, a specific set of one or more vehicle operating parameters of an identified profile package may be activated. The third party may provide the look-up table to the server so that the server may associate a head unit with a mobile device. For example, the owner of a fleet of service vehicles may employ several service fleet drivers with mobile devices. Each of the service vehicles may comprise a head unit as previously disclosed herein. The owner of the service vehicles may provide a list of mobile device identifications for the mobile devices of each of his service vehicle drivers and a list of service vehicles head unit identifications for each of the head units on his service vehicles. Thus, when the a mobile device, listed in the look-up table, is in a predetermined position, for example, a predetermination position relative to the head unit also listed in the look-up table, a specific set of one or more vehicle operating parameters of a profile package may be activated with the vehicle.

In an embodiment, as previously disclosed, a server may associate a head unit with a mobile device by detecting that the mobile device is disposed at one or more predetermined positions. For example, the server may identify that the family automobile is being driven, for example, by detecting the change in position of the head unit. Additionally, a server may identify that the mobile device of a sixteen year old boy who recently acquired his driver's license is in the cabin of the family automobile, for example, by detecting the mobile device is a relatively constant distance away from the head unit. Thus, by determining that the mobile device is in the cabin of the family vehicle, a server may associate the mobile device with the head unit of the vehicle. Additionally, as will be discussed further herein, a server may identify one or more profile packages that may comprise vehicle operating parameters in response to detecting that the sixteen year old boy (i.e. the boy's mobile device) is in the cabin of the family automobile.

At block 404, a server may identify one or more vehicle operating parameters in response to associating the head unit with mobile device. For example, the vehicle operating parameter of a maximum speed limit of 60 miles per hour may be identified in response to associating the head unit of fleet vehicle X with a mobile device of employee A, where employee A is authorized to operate fleet vehicle X. In an embodiment, the head unit may be associated with the mobile device via look-up table. For example, an owner of a fleet of vehicles may program a server using a look-up table to identify a first set of one or more vehicle operating parameters comprising a maximum speed limit of 60 miles per hour for employees A, B, and C (i.e. the mobile devices of employees A, B, and C) such that when employees A, B, or C drive one of the fleet vehicles, the server identifies, via the look-up table, a profile package comprising the vehicle operating parameter of a maximum speed limit of 60 miles per hour. Additionally, for example, the owner of the fleet of vehicles may program a server using a look-up table to identify a second set of one or more vehicle operating parameters comprising fuel economy for employees D, E, and F (i.e. the mobile devices of employees D, E, and F) such that when employees D, E, or F drive one of the fleet vehicles, the server identifies, via the look-up table, a profile package comprising the vehicle operating parameter of fuel economy and may not identify a profile package comprising the vehicle operating parameter of a maximum speed limit of 60 miles per hour. As will be discussed further herein, the identified profile packages may be transmitted to the associated head units of the vehicles and activated.

In an embodiment, the head unit may be associated with the mobile device by detecting that the mobile device is disposed at one or more predetermined positions. For example, an owner of a fleet of vehicles may program a server to identify a set of one or more vehicle operating parameters comprising turning off the vehicle when the vehicle (e.g. the mobile device owned by employees A, B, and C located in the vehicle) is located in a location not authorized by the fleet owner. For example, the fleet owner may only operate and/or do business in Dallas, Tex. Thus, if an employee operating that vehicle decides to use the vehicle, for example, for personal use and drive to Fort Worth, Tex., the vehicle may not operate or may not move any faster than 20 miles per hour once the vehicle moves outside of Dallas, Tex. This feature may allow service trucks for example to be used for business purposes only and thus prevents personal miles from accumulating on a fleet of service trucks.

In an embodiment, the head unit may be associated with the mobile device by detecting that the mobile device is disposed at one or more predetermined positions such that when mobile device user enters the cabin of a vehicle an association may be created between the head unit of the vehicle and the mobile device user. For example, a 17-year-old may have received multiple speeding tickets for racing automobiles on the public streets. The 17-year-old's parents may want to apply a governor to every automobile the 17-year-old drives so that the 17-year-old cannot drive faster than 65 miles per hour. Thus, when the 17-year-old enters the cabin (e.g. sits in the driver's seat) of her own automobile and/or a friend's automobile, the automobile will not exceed 65 miles per hour.

In an embodiment, GPS technology may determine the location of the 17-year-old's mobile device relative to the head unit and associate the mobile device with the head unit. One of ordinary skill in the art will appreciate after reading this disclosure the various embodiments by which GPS technology and/or other location identification technology may locate the positions of both the mobile device and the head unit.

At block 406, similar to previous embodiments, a profile package may be identified based on the identification of the one or more vehicle operating parameters, wherein the profile package comprises at least the one or more vehicle operating parameters. One of ordinary skill in the art will readily select a method after reading this disclosure by which a profile package may be identified. At block 408, similar to previous embodiments, the profile package associated with the mobile device may be transmitted via the head unit to one or more controllers, wherein the profile package configures one or more controllers to a specific set of one or more vehicle operating parameters, wherein the one or more controllers govern the behavior of one or more vehicle components. At block 410, similar to previous embodiments, the specific set of one or more vehicle operating parameters of the profile package are activated in response to detecting that the mobile device is disposed at a predetermined position.

Figure 5:
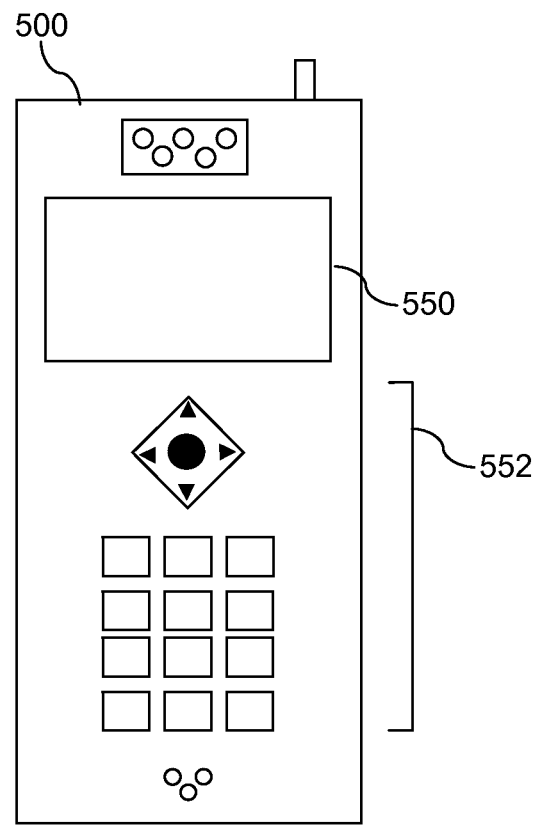
FIG. 5 is an illustration of a mobile device according to an embodiment of the disclosure.

FIG. 5 shows a mobile device 500. FIG. 5 depicts the mobile device 500, which is operable for implementing aspects of the present disclosure, but the present disclosure should not be limited to these implementations. Though illustrated as a mobile communication device, the mobile device 500 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 500 is not a general purpose computing device like a portable, laptop or tablet computer, but rather is a special-purpose communications device such as a mobile communication device, wireless handset, pager, or PDA. The mobile device 500 may support specialized activities such as gaming, inventory control, job control, and/or task management functions, and so on.

The mobile device 500 includes a display 550 and a touch-sensitive surface and/or keys 552 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500.

Figure 6:
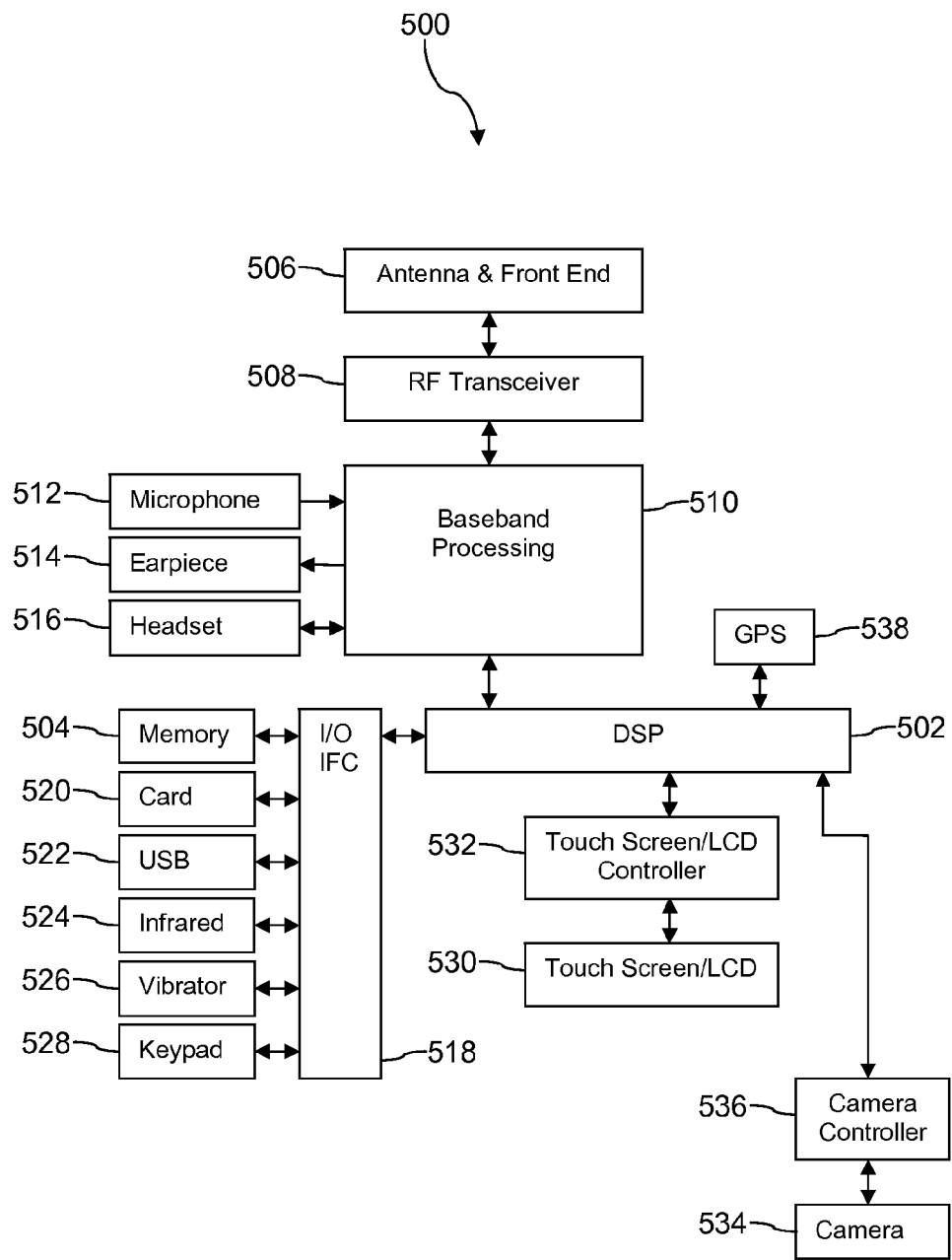
FIG. 6 is a block diagram of a mobile device according to an embodiment of the disclosure.

FIG. 6 shows a block diagram of the mobile device 500. While a variety of known components of mobile device 500 are depicted, in an embodiment a subset of the listed components and/or additional components not listed may be included in the mobile device 500. The mobile device 500 includes a digital signal processor (DSP) 502 and a memory 504. As shown, the mobile device 500 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 500 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 500 to send and receive information from a radio access network (RAN) or some other available wireless communications network or from a peer mobile device 500. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 500 to be used as a mobile communication device. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 500 to function as a peripheral device to exchange information with a personal computer or other computer system. The infrared port 524 and other optional ports such as a Bluetooth interface or an IEEE 802.11 compliant wireless interface may enable the mobile device 500 to communicate wirelessly with other nearby handsets and/or wireless base stations.

The input/output interface 518 may further connect the DSP 502 to the vibrator 526 that, when triggered, causes the mobile device 500 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 500. Another input mechanism may be the touch screen LCD 530, which may also display text and/or graphics to the user. The touch screen LCD controller 532 couples the DSP 502 to the touch screen LCD 530.

The CCD camera 534 enables the mobile device 500 to take digital pictures. The DSP 502 communicates with the CCD camera 534 via the camera controller 536. The GPS sensor 538 is coupled to the DSP 502 to decode global positioning system signals, thereby enabling the mobile device 500 to determine its position. In another embodiment, a camera operating according to a technology other than charge coupled device cameras may be employed. Various other peripherals also may be included to provide additional functions, e.g., radio and television reception.

Figure 7A:
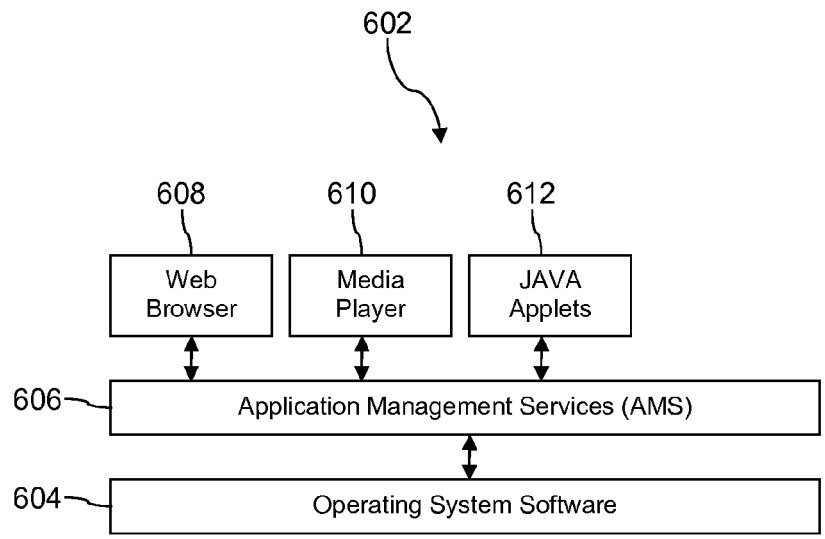
FIG. 7A is a block diagram of a software architecture for a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 500. Also shown in FIG. 7 are a web browser application 608, a media player application 610, and JAVA applets 612. The web browser application 608 configures the mobile device 500 to operate as a web browser, allowing a user to enter information into forms and select links to retrieve and view web pages. The media player application 510 configures the mobile device 500 to retrieve and play audio or audiovisual media. The JAVA applets 612 configure the mobile device 500 to provide games, utilities, and other functionality.

Figure 7B:
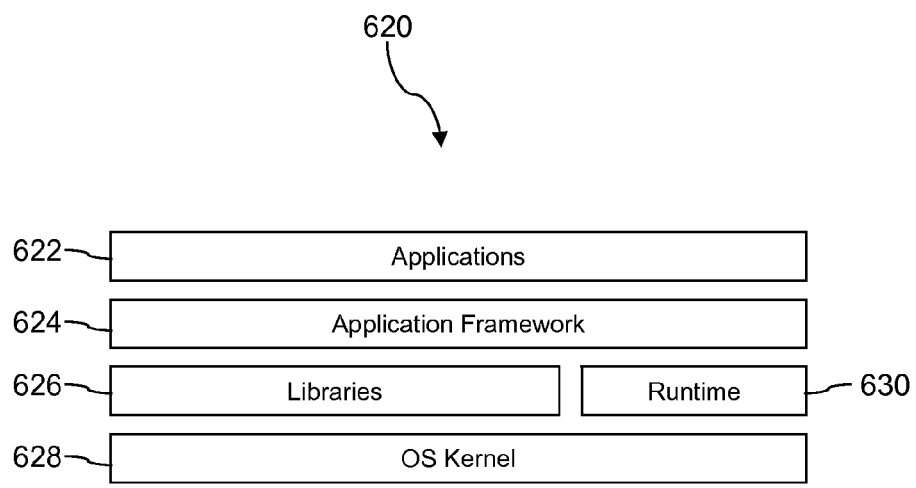
FIG. 7B is a block diagram of a software architecture for a mobile device according to an embodiment of the disclosure.

FIG. 7B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
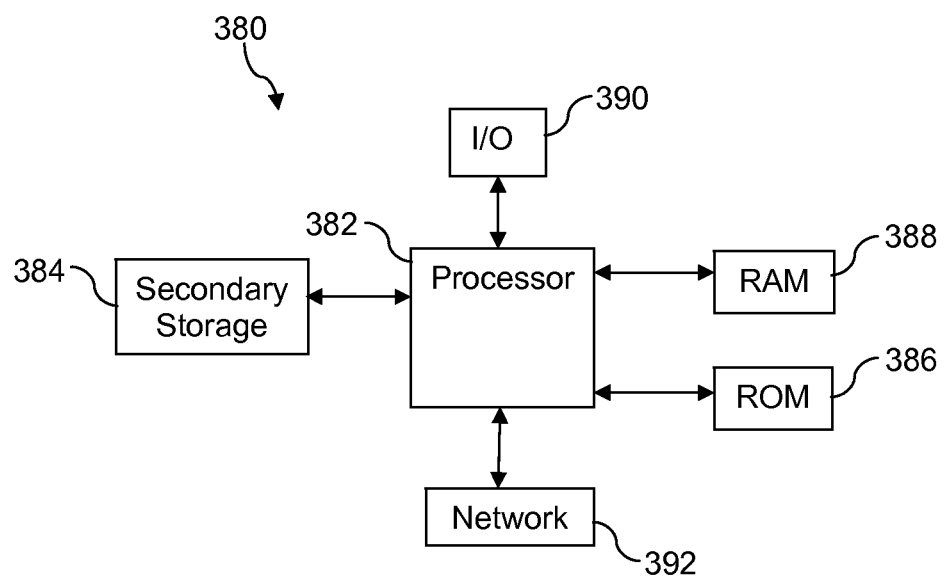
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of configuring operating parameters with a vehicle, comprising:

receiving a signal, by a server, identifying one or more vehicle operating parameters;

associating the signal identifying one or more vehicle operating parameters with a mobile device;

identifying a profile package based on the identification of the one or more vehicle operating parameters, wherein the profile package comprises at least the one or more vehicle operating parameters;

receiving a signal, by the server, associating the mobile device with a head unit;

transmitting the profile package associated with the mobile device via the head unit to one or more controllers, wherein the profile package configures one or more controllers to a specific set of one or more vehicle operating parameters, and wherein the one or more controllers govern the behavior of one or more vehicle components;

activating the specific set of one or more vehicle operating parameters of the profile package in response to detecting that the mobile device is disposed at a predetermined position; and deactivating the specific set of one or more vehicle operating parameters of the profile package in response to at least one of:
  detecting that the mobile device is no longer located at the predetermined position,
  detecting that the mobile device is not located within a predetermined, geographic area, or
  receiving a signal from the mobile device deselecting the specific set of one or more vehicle operating parameters of the profile package.

2. The method of claim 1, wherein the predetermined position is within a predetermined distance from the head unit.

3. The method of claim 1, wherein the predetermined position is one or more specific locations relative to the head unit.

4. The method of claim 1, further comprising operating a vehicle associated with the head unit while maintaining the specific set of one or more vehicle operating parameters.

5. The method of claim 1, wherein vehicle operating parameters comprise increasing vehicle performance, increasing fuel economy, tightening steering, loosening steering, tightening suspension, loosening suspension, increasing horse power limits, increasing torque limits, increasing speed limits, increasing acceleration limits, customizing speed rates, customizing acceleration rates, adjusting seat positions, adjusting the steering wheel, adjusting vehicle mirrors, and the like.

6. A method of configuring operating parameters with a vehicle, comprising:
  detecting, by a head unit, one or more environmental parameters; receiving a signal, by a server, from the head unit, identifying the one or more environmental parameters and the time the head unit detected the one or more environmental parameters;
  associating, by the server, the one or more environmental parameters with a mobile device by identifying that the mobile device was in a predetermined position at the time the head unit detected the one or more environmental parameters;
  identifying a profile package based on the identification of the one or more environmental parameters, wherein the profile package comprises one or more vehicle operating parameters comprising the one or more environmental parameters;
  receiving a signal, by the server, associating the mobile device with the head unit;
  displaying the identified profile package based on the identification of the one or more environmental parameters;
  transmitting the profile package associated with the mobile device via the head unit to one or more controllers based on a selection from displaying of the profile package, wherein the profile package configures one or more controllers to a specific set of one or more vehicle operating parameters, and wherein the one or more controllers govern the behavior of one or more vehicle components; and
  activating the specific set of one or more vehicle operating parameters of the profile package in response to detecting that the mobile device is disposed at the predetermined position.

7. The method of claim 6, wherein the predetermined position is within a predetermined distance from the head unit.

8. The method of claim 6, wherein the predetermined position is one or more specific locations relative to the head unit.

9. The method of claim 6, further comprising deactivating the specific set of one or more vehicle operating parameters of the profile package in response to detecting that the mobile device is no longer located at the predetermined position.

10. The method of claim 6, wherein the one or more environment parameters comprise parameters associated with specific internal components of the vehicle, parameters reflecting how the vehicle is operated, settings within the vehicle, setting within the vehicle cabin, and external conditions surrounding the vehicle.

11. The method of claim 6, further comprising associating, by the server, the one or more parameters with a mobile device and a particular geographic location by identifying that the mobile device was in a predetermined position at the time the head unit detected the one or more parameters and by detecting that the head unit was in a particular geographic location at the time the head unit detected the one or more parameters.

12. A method of implementing vehicle operating parameters, comprising:
  associating, by a server, a head unit with a mobile device;
  identifying one or more vehicle operating parameters in response to associating the head unit with the mobile device, wherein the one or more vehicle operating parameters are identified by a server;
  identifying a profile package based on the identification of the one or more vehicle operating parameters, wherein the profile package comprises the one or more vehicle operating parameters;
  transmitting the profile package associated with the mobile device via the head unit to one or more controllers, wherein the profile package configures one or more controllers to a specific set of one or more vehicle operating parameters, and wherein the one or more controllers govern the behavior of one or more vehicle components;
  activating the specific set of one or more vehicle operating parameters of the profile package in response to detecting that the mobile device is disposed at one or more predetermined position; and
  deactivating the specific set of one or more vehicle operating parameters of the profile package in response to detecting that the mobile device is no longer located at the one or more predetermined position.

13. The method of claim 12, wherein the head unit is associated with the mobile device via a look-up table.

14. The method of claim 12, wherein the head unit is associated with the mobile device by detecting that the mobile device is disposed at the one or more predetermined positions.

15. The method of claim 12, further comprising operating a vehicle associated with the head unit while maintaining the specific set of one or more vehicle operating parameters.

* * * * *